3,153,069
PROCESS FOR THE MANUFACTURE OF β-METHYLMERCAPTOPROPIONALDEHYDE

Hans-Joachim Schultze and Clau Berther, Chur, Switzerland, assignors to Inventa A.G. fuer Forschung und Patentverwaltung, Zurich, Switzerland
No Drawing. Filed Nov. 21, 1961, Ser. No. 154,022
Claims priority, application Switzerland Nov. 22, 1960
1 Claim. (Cl. 260—601)

The invention relates to an improved process for the manufacture of β-methylmercaptopropionaldehyde and, more particularly, to a process using a low excess of methylmercaptan and cobalt salts as catalysts.

β-Methylmercaptopropionaldehyde is produced by an addition reaction of methylmercaptan on acrolein. One of the numerous uses for the end product is the methionine synthesis.

The reaction gives satisfactory yields only when suitable catalysts are used. It previously had been proposed, for instance, in U.S. Patent 2,485,236, to carry out the reaction between acrolein and methylmercaptan in the presence of pyridine and other non-acid catalysts and to use an excess of 100 percent methylmercaptan. An improvement of this process had been suggested in U.S. Patent 2,676,190, wherein the reaction is carried out in an autoclave and whereby an excess methylmercaptan is not required.

When the reaction is undertaken under pressure, organic peroxides have been used as catalysts, according to U.S. Patent 2,521,677 and British Patent 687,483.

Special catalysts have been suggested for the reaction at atmospheric pressure, e.g., copper acetate, in U.S. Patent 2,521,677. However, the yields obtained thereby fluctuate over the broad range of 29–90 percent.

The processes named above, therefore, require either a great excess of methylmercaptan or a reaction under pressure, in order to obtain satisfactory yields of β-methylmercaptopropionaldehyde. The employment of organic peroxides requires an additional operational step since the catalyst must be removed, for reasons of safety, prior to the distillation of the crude β-methylmercaptopropionaldehyde. The use of copper acetate as catalyst leads to a poor reproducibility of the yields.

It now has been found that, without incurring any of the drawbacks named above, the reaction between acrolein and methylmercaptan proceeds at atmospheric pressure and leads to good yields, when cobalt salts are used as catalysts and the excess of methylmercaptan is held very low. This process obviates the necessity of using pressure equipment and of catalyst removal prior to refining of the crude reaction product.

Suitable catalysts are, e.g., cobalt acetate, cobalt naphthenate and cobalt methylmercaptide. It also is feasible to employ cobalt salts, especially cobalt methyl mercaptide, precipitated on inert carrier substances, such as carbon, pumice, silica gel or aluminum oxide (alumina). Catalyst substances on a carrier can be removed from the reaction mixture after the termination of the reaction and can be reused in ensuing runs. This is of particular advantage when the process is carried out continuously. Optimum effects are obtained with catalyst quantities of 0.1 to 0.5 percent by weight, calculated on the acrolein used. The catalysts named permit the reaction to be accomplished at temperatures between −30 and plus 50° C. Even when working in a temperature range of 0° to −30° C., the reaction time is prolonged only immaterially, which fact bespeaks the reactivity of these catalysts. It is especially worth mentioning that even the presence of water, in amounts up to 5 percent, in the reaction mixture, does not impair the reactivity of these catalysts. Therefore, a pre-drying of the reagents, in order to facilitate refining of the end product, is required solely when the water content exceeds 5 percent, that is, in very isolated instances.

The reaction is carried out in the manner described below in molar proportions of acrolein to methylmercaptan of 1:1 to 1:1.6, preferably, of 1:1.2 to 1:1.3. Due to this extremely slight excess of the mercaptan, the refining operation of the crude end product is facilitated considerably. Depending upon the temperature employed in the reaction, either the methylmercaptan or the acrolein is entered in the reactor together with a slight amount of the catalyst. The reactor is provided with an agitator, a thermometer and a highly efficient condenser. In a continuous production of β-methylmercaptopropionaldehyde on a production-base, large scale process, it is possible to recycle the first run of the distillation, consisting of methylmercaptan together with a slight amount of β-methylmercaptopropionaldehyde, into the process together with fresh methylmercaptan. This recycling of the first run or pre-run into the reaction has the effect that the reaction between acrolein and methylmercaptan proceeds considerably more quietly than in a batch process because the methylmercaptopropionaldehyde introduced concurrently acts as a moderator.

Especially when the acrolein is added to the liquid methylmercaptan, the reaction starts immediately and can readily be controlled. The reaction product can be fractionated under reduced pressure without removing the catalyst prior thereto. In this manner, pure β-methylmercaptopropionaldehyde is obtained in excellent yields.

The invention now will be further illustrated by the following examples. However, it should be understood that these are given merely by way of explanation, not of limitation, and that numerous changes may be made in the details without departing from the spirit and the scope of the invention as hereinafter claimed.

Example 1

168.0 g. freshly distilled acrolein (3 mols) were added within 15 minutes at 0 to 5° C. to 194.8 g. 97.4 percent methylmercaptan (3.9 mols) to which previously 0.75 g. finely powdered cobalt acetate had been added as a catalyst. The addition of the latter mixture was carried out under intensive agitation. The reaction started immediately and was held at 5° C. during the first 30 minutes by external cooling, then was held for another 60 minutes at room temperature. After ensuing distillation of the crude product obtained, 303 g. β-methylmercaptopropionaldehyde were obtained, corresponding to 96.5 percent of theory. The index of refraction was $n_D^{20}$ 1.4821, theory 1.4822.

Example 2

0.25 g. cobalt naphthenate was dissolved in 63 g. 97–98 percent liquid methylmercaptan, and to this solution 56 g. pure acrolein were added dropwise at 0° C. and with good external cooling within 10 minutes. The molar ratio of acrolein to methylmercaptan was 1:1.3. After 30 minutes, the temperature was allowed to rise to 15–20° C., and the reaction was complete after another 30–60 minutes.

The crude product obtained was refined by vacuum distillation. 91 g. β-methylmercaptopropionaldehyde thus were obtained having a refractive index $n_D^{20}$ of 1.4822. The yield was 87.55 percent of theory. When the excess of methylmercaptan was increased to a molar proportion of acrolein to methylmercaptan of 1:1.6, the yield of β-methylmercaptopropionaldehyde was 98.5 percent of theory.

Example 3

0.5 g. freshly precipitated cobalt methylmercaptide were suspended in 65 g. liquid methylmercaptan. To this mixture, 56 g. acrolein were added at a temperature of 0–5° C. within 10 minutes with good agitation. After 30 minutes, the temperature was allowed to rise to 15–20° C., and after another 30–60 minutes, the reaction had terminated.

The crude product was subjected to vacuum distillation for refining. The yield of β-methylmercaptopropionaldehyde thus obtained was 97.53 g., i.e., 93.6 percent of theory.

*Example 4*

A mixture of 66 g. methylmercaptan with 0.095 g. cobalt acetate was kept at a temperature of 0 to 5° C., and 60 g. acrolein (93 percent pure acrolein, 7 percent water) were added thereto within 10 minutes. After another 30 minutes, the crude product obtained was refined by vacuum distillation. 98.1 g. pure methylmercaptopropionaldehyde were obtained, i.e., 94.3 of theory.

*Example 5*

8.5 g. pumice of a particle size of 0.2–0.3 cm., on which 127 mg. cobalt methylmercaptide had been precipitated, were added to 62 g. methylmercaptan. This mixture was well agitated, and 56 g. acrolein were added within 15 minutes while the mixture was kept at 0° C. The reaction was completed within 85 minutes. The catalyst carrier was filtered, and the reaction product refined by distillation under reduced pressure. 76.95 g. pure β-methylmercaptopropionaldehyde were obtained, corresponding to 73.95 percent of the theory.

We claim as our invention:

A process for the manufacture of β-methylmercaptopropionaldehyde by the reaction of methylmercaptan with acrolein in molar proportions of 1:1 to 1.6:1, at atmospheric pressure and at temperatures of −30 to plus 50° C. and in the presence of 0.1 to 0.5 percent by weight, calculated on the acrolein used, of a catalyst selected from the group consisting of cobalt acetate, cobalt naphthenate and cobalt methylmercaptide.

References Cited in the file of this patent

UNITED STATES PATENTS 2,584,496   Pierson _____ Feb. 5, 1952